United States Patent [19]

Nickols

[11] Patent Number: 4,896,138

[45] Date of Patent: Jan. 23, 1990

[54] BICYCLE BRAKING INDICATOR LIGHT ASSEMBLY

[76] Inventor: Paul G. Nickols, P.O. Box 411182, Kansas City, Mo. 64141

[21] Appl. No.: 220,005

[22] Filed: Jul. 15, 1988

[51] Int. Cl.⁴ .............................................. B60Q 1/44
[52] U.S. Cl. .................................... 340/479; 340/432; 200/61.12; 200/61.87; 362/72
[58] Field of Search .................. 340/71, 134, 69, 432, 340/479, 427; 362/72; 188/1.11, 2 D; 200/61.12, 61.87

[56] References Cited

U.S. PATENT DOCUMENTS 4,031,343 6/1977 Sopko ................................. 340/134
4,586,021 4/1986 Nickols ............................... 340/134

Primary Examiner—Donnie L. Crosland
Attorney, Agent, or Firm—Kokjer, Kircher, Bradley, Wharton, Bowman & Johnson

[57] ABSTRACT

A battery powered lamp mounted on a bicycle is turned on and off in response to operation of a switch mechanism actuated by operation of the hand brake. The switch mechanism is mountable on the brake actuating cable in association with the caliper of the brake mechanism without requiring disassembly and reassembly of the cable with the caliper.

5 Claims, 1 Drawing Sheet

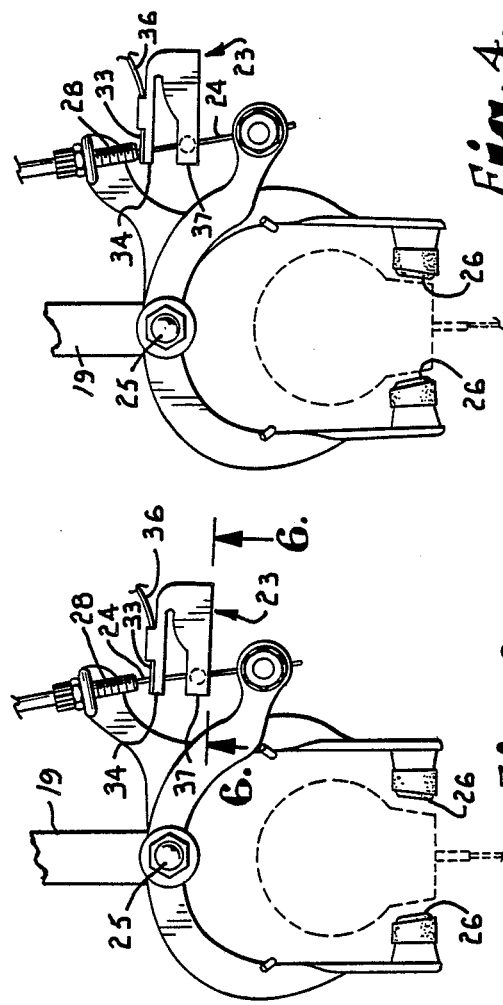
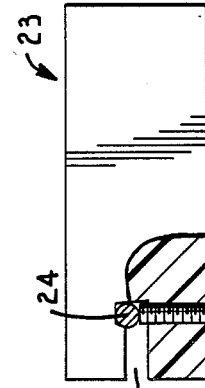
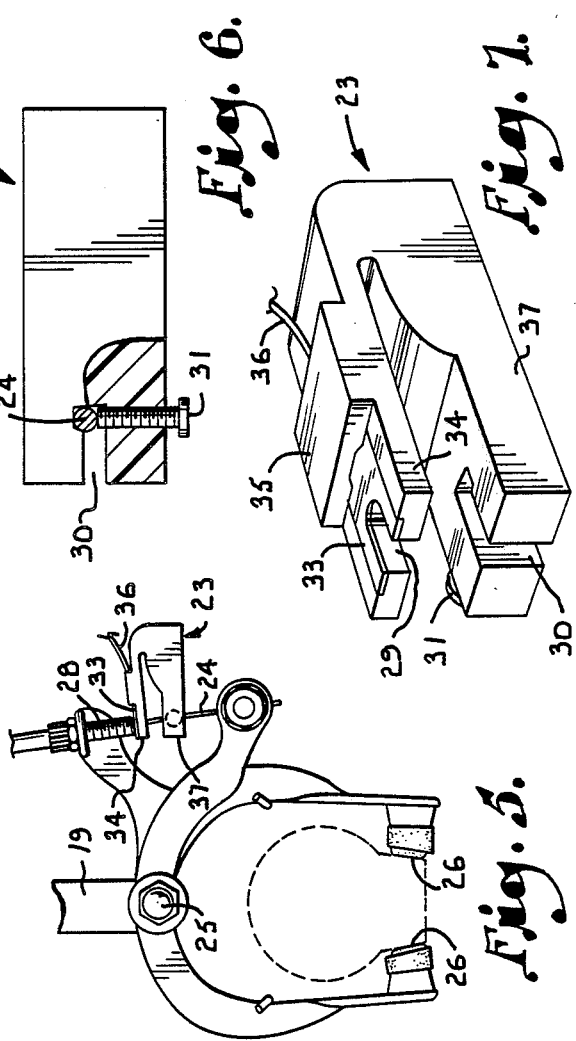
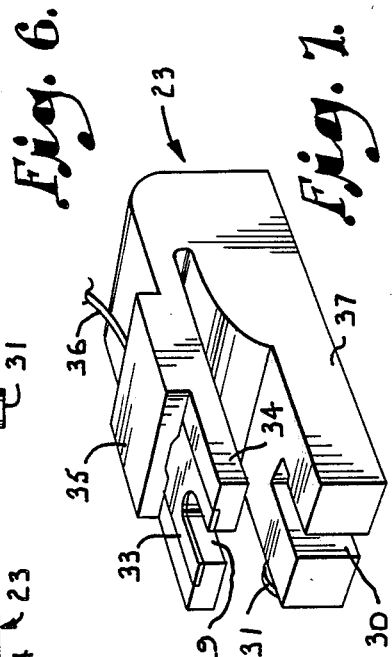
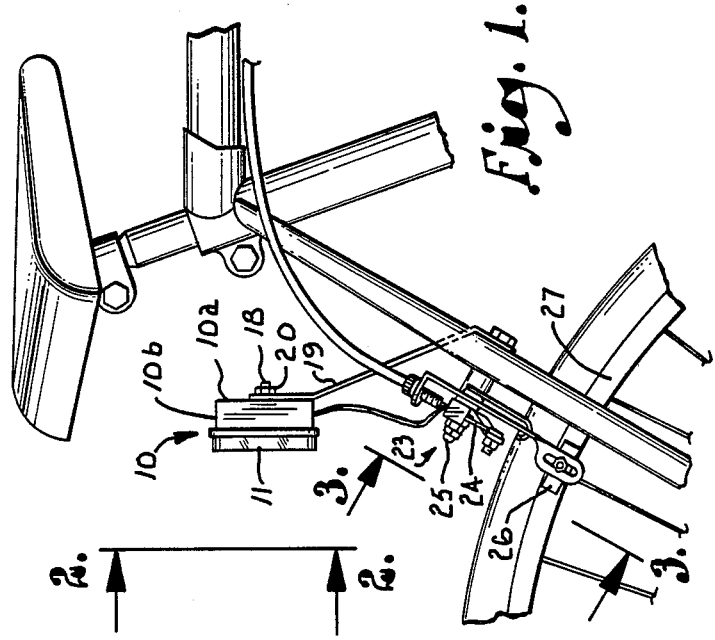
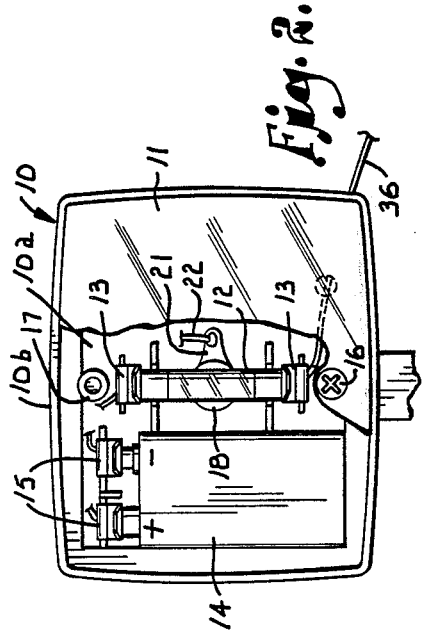

BICYCLE BRAKING INDICATOR LIGHT ASSEMBLY

FIELD OF THE INVENTION

This invention relates to bicycle accessories and more particularly, provides an electrical brake indicator light for the bicycle which is turned on and off in response to operation of the hand brake of the bicycle.

BACKGROUND OF THE INVENTION

Brake indicator lights operated responsive to the application of the bicycle hand brake are known. See, for example, U.S. Pat. Nos. 3,188,418; 3,435,165; 3,521,233; 3,703,620; 3,870,846; and 4,031,343. While all of the systems disclosed in the foregoing patents have the attribute of providing a brake light indicator in response to actuation of the hand brake, still they are generally fairly complex systems which require use of the bicycle frame or wheel as part of the electrical system, or require partial disassembly of the bicycle braking system in order to permit incorporation of the system with the bicycle.

What has been needed is a very simple and inexpensive kit containing components which are readily assembled with the bicycle and which do not require any disassembly of the bicycle braking system in order to complete the installation.

SUMMARY OF THE INVENTION

My invention provides a brake light system having as its key operative component, other than the light itself, a simple electrical contact carrying element which can be attached directly to the brake cable. The mode of attachment is by a single and simple set screw. The attachment of the contact carrying element to the brake cable is made directly. The cable need not be disconnected in order for the lighting system to be placed on the bicycle or for adjustment of the contact carrying element. A single conductor connects the contact of the contact carrying element with a battery powered lamp which is mounted to the reflector bracket which usually forms a part of the standard caliper brake assembly. The contact carrying element can fit a wide variety of hand brake systems and is extremely simple in installation and operation.

Other objects and advantages of the invention, together with the features of novelty appurtenant thereto will appear in the course of the following description.

DETAILED DESCRIPTION OF THE INVENTION

In the accompanying drawings which form a part of the specification and are to be read in conjunction therewith, and in which like reference numerals indicate like parts in the various views;

FIG. 1 is a fragmentary side elevational view of the rear wheel, rear yoke and frame of a bicycle equipped with the preferred embodiment of the braking indicator light assembly according to my invention;

FIG. 2 is an enlarged fragmentary view of the light housing, being taken generally from line 2—2 of FIG. 1 in the direction of the arrows, part of the reflector-lens being broken away for purposes of illustration;

FIG. 3 is a fragmentary view taken generally from line 3—3 of FIG. 1 in the direction of the arrows, the bicycle tire and wheel being shown in broken lines;

FIG. 4 is a view similar to FIG. 3 but showing the relative position of the parts at the initiation of electrical contact and closing of the circuit through the brake lamp;

FIG. 5 is a view similar to FIGS. 3 and 4 but showing the relative position of the components at full application of braking pressure;

FIG. 6 is a bottom plan view, on an enlarged scale, of the contact carrying element, being taken generally along line 6—6 of FIG. 3 in the direction of the arrows; and FIG. 7 is an enlarged perspective view of the contact carrying element disassembled from the brake cable.

The braking light itself is contained within a boxlike housing 10 which is preferably molded of a suitable plastic. The housing is generally of open front, cup-shape, having the rear wall 10a and continuous sidewall 10b. A combined reflector-lens 11 covers the front of the housing.

Located inside the housing is a lamp 12 removably fitted between spring contact elements 13 secured to the inside bottom wall of the housing. A battery 14 connects with appropriate spring contacts 15 which are interconnected with the lamp and the electrical conductors later to be described. The reflector-lens is secured to the housing by two (only one is shown) screws 16 such as exemplified in FIG. 2 connected to molded posts 17 extending forwardly from the inside base of the housing.

The housing is provided with a central aperture which receives therethrough a bolt 18. Bolt 18 connects with the apertured end of the reflector bracket 19 which is mounted to the brake system of the bicycle. A nut 20 secures the housing to the bracket. The bolt 18 also contacts the ground contact 21 which is connected to the negative side of the battery 14 by conductor 22.

The mechanism for energizing the lamp includes as its primary component the electrical contact carrying element indicated generally by reference number 23. This element is connected directly to the control cable 24 for the hand brake.

The brake system is conventional, including a pair of arms pivoted to one another as at 25 and operated by the control cable 24 which extends forwardly to the hand levers on the handle bar (neither of which are shown) for the bicycle. The arms carry at their lower ends brake pads 26 which can be clamped against the wheel rim 27 to apply braking power in response to operation of the hand levers.

The contact carrying element 23 is mounted to the cable directly below the cable guide sheath 28 which is mounted to one of the brake arms. As can best be seen by reference to FIG. 7, the contact element is placed on the cable by positioning it so that the two edgewise slots 29 and 30 formed in the parallel legs 34 and 37 of the contact carrier can be moved laterally into engagement with the cable. The contact carrier is then secured in place by a set screw 31 (see FIG. 6) which engages the cable and seats it in a slight lateral recess 32 formed at the base of the slot 30.

As previously indicated, the contact carrier includes a pair of spaced legs. The electrical contact is indicated at 33, being a sheet of conductive material slotted like the upper leg 34 and resting upon the upper leg. It is retained in place by fitting into a slot formed in a projection 35 on top of the contact member. The contact member connects with conductor 36 which leads to the lamp assembly as previously described.

The contact carrier 23 is constructed of a dielectric material, such as a suitable plastic. It should be constructed of a material that is sufficiently resilient as to permit flexing of the upper leg 34 relatively toward the base leg 37 and having sufficient resilience to return the upper leg to its original position once flexing has occurred.

In operation, the contact carrying member 23 is installed on the cable in a position to separate the contact 33 from the end of the cable sheath 28 (which, incidentally, is made of conductive material) when the brake is in the open or nonactuated position.

As the hand brake is actuated, the contact carrying element 23 and the cable sheath 28 are impelled toward one another. The location of the contact carrying element on the cable relative to the sheath is such that the end of the sheath will make contact with the contact before the brakes are completely closed. This position is illustrated in FIG. 4. From this point forward, the lamp will remain illuminated, since the circuit is closed by contact of the contact element with the sheath, because the sheath is connected with the negative side of the circuit through the metal parts of the brake, the reflector bracket and the means securing the reflector bracket to the lamp as earlier described. This includes the inside contact 21 illustrated in FIG. 2. The lamp will remain lit as the brake is completely closed, which is the position illustrated in FIG. 5. The resiliency of the material of which the contact carrying element is made permits deflection, or flexing, of the upper leg 34 toward the lower leg. Upon release of the brake the upper leg will return to its original position and the sheath will separate from the contact, returning to the position of FIG. 3 in which the lamp is off.

It will be evident that the closer the contact carrying element is to the cable sheath, the sooner the lamp will be energized. Consequently, by making adjustments as desired, sensitivity to the touch of the rear hand brake can be maintained. The entire assembly is light in weight, very easy to install and remove, and operates with a minimum of moving parts. As previously noted, installation and removal of the contact carrying element 23 in particular does not require disconnection of the cable or disassembly of an parts of the brake.

From the foregoing, it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense

Having thus described my invention, I claim:

1. For a bicycle having a hand operated caliper brake mechanism including a control cable and a cable guide assembly which includes a cable guide member movable relative to an along a portion of said cable,
   a braking light indicator assembly including
   (a) an electric lamp mounted on the bicycle;
   (b) means for providing a source of electrical energy for said lamp; and
   (c) an electrical contact carrier member operable to connect and disconnect said source with said lamp, said carrier member including
   (i) a base leg and an electric contact carrying leg, said legs being generally parallel with one another and each having an open end slot in which the cable is received
   (ii) means cooperating with said slot in the base legs to anchor said base leg to said cable with the contact carrying leg positioned adjacent but spaced from said cable guide member, said cable being loosely received in the slot in said contact carrying leg for movement relative to said leg,
   (iii) electric contact means on said contact carrying leg and operable upon contact between said cable guide member and contact to connect said lamp with said source.

2. A braking light indicator assembly as in claim 1, said contact carrying leg being resiliently movable toward said base member by said cable guide member.

3. A braking light indicator assembly as in claim 2, said carrier member, base leg and contact carrying leg being integral with one another.

4. A brake indicator light actuator for mounting on the control cable of a caliper brake mechanism, said actuator comprising
   (a) a body configured to provide a pair of parallel legs separated from one another, said legs defined as a base leg and an electric contact carrying leg, each said leg having an open end slot in which the cable is received
   (b) means for cooperating with said slot to anchor said base leg to said cable, said cable being loosely received in the slot in said contact carrying leg to permit movement of said cable relative to said leg; and
   (c) electric contact means on said contact carrying leg.

5. A brake indicator light actuator as in claim
   said contact carrying leg being resiliently movable toward said base member.

* * * * *